United States Patent [19]

Maillefer

[11] Patent Number: 4,907,432

[45] Date of Patent: Mar. 13, 1990

[54] SAFETY DEVICE FOR A PRESS BRAKE OR SIMILAR MACHINE

[75] Inventor: Jean-Claude Maillefer, Orny, Switzerland

[73] Assignee: Cybelec S.A., Yverdon-Les-Bains, Switzerland

[21] Appl. No.: 344,517

[22] Filed: Apr. 21, 1989

Related U.S. Application Data

[63] Continuation of Ser. No. 114,401, Oct. 14, 1987, abandoned.

[30] Foreign Application Priority Data

Oct. 14, 1986 [CH] Switzerland .......................... 4098/86

[51] Int. Cl.$^4$ .............................................. B21D 55/00
[52] U.S. Cl. ............................................. 72/1; 72/26; 72/389
[58] Field of Search ............... 72/1, 21, 26, 37, 389; 192/129 R, 129 A, 130

[56] References Cited

U.S. PATENT DOCUMENTS

| | | | |
|---|---|---|---|
| 3,841,140 | 10/1974 | Hyre | 72/443 X |
| 4,166,369 | 9/1979 | Nakajima | 72/389 X |
| 4,357,820 | 11/1982 | Blanchard | 72/389 |
| 4,489,578 | 12/1984 | Nagai et al. | 72/389 X |
| 4,660,703 | 4/1987 | Filcich et al. | 192/130 |
| 4,753,100 | 6/1988 | Hanni | 72/389 |

FOREIGN PATENT DOCUMENTS

| | | |
|---|---|---|
| 2750234 | 1/1979 | Fed. Rep. of Germany ... 192/129 A |
| 3116292 | 11/1982 | Fed. Rep. of Germany . |
| 2512920 | 3/1983 | France ..................................... 72/1 |
| 2540224 | 8/1984 | France . |

Primary Examiner—E. Michael Combs
Attorney, Agent, or Firm—Willian Brinks Olds Hofer Gilson & Lione

[57] ABSTRACT

A safety device comprises a laser beam (7) emitted by an emitter located at one side of a press and received by a receiver located at the other side of the press. The beam is directed in parallel with the edge (5) of the punch of the press (1) at a distance from the surface (4) of the metal sheet lying between the thickness of a finger and the stopping distance of the punch at low speed. A device disposed in the diameter of the beam enables actual measurement of the speed of motion of the punch or of any body being carried along by the punch, so as to order interruption of the motion of the punch when the measured speed is higher than a predetermined speed.

12 Claims, 3 Drawing Sheets

SAFETY DEVICE FOR A PRESS BRAKE OR SIMILAR MACHINE

This application is a continuation, of application Ser. No. 97/114,401, filed Oct. 14, 1987 abandoned.

FIELD OF INVENTION

The invention is concerned with a safety device of the intangible barrier type for a press brake or a similar machine.

BACKGROUND OF THE INVENTION

Safety devices of the light barrier type are known which enable immediate stoppage of the motion of the machine to be ordered when the presence of a foreign body such, for example, as a tool or the operator's hand is detected in a zone forbidden to access.

Amongst the devices known, an interesting device is described in the French Pat. No. 2,512,920. This device consists of a laser emitter located at one side of the press and emitting a laser beam directed in parallel with the edge of the punch and extending in the immediate vicinity of the vertical plane passing through the bottom edge of the punch, at a distance above the upper surface of the piece to be folded, which lies between the thickness of a finger and the stopping distance of the punch at low speed. If a body is introduced into the danger zone either transversely or pushed in front of the punch as it descends, the travel of the punch is interrupted. The system is automatically put out of action the instant the punch reaches the beam. At this moment the distance between the punch and the upper surface of the metal sheet is such that it is no longer possible to introduce a finger between.

This device has the advantage of allowing the operator great freedom of manipulation of the piece to be folded on the machine, as opposed, for example, to a light curtain insntalled in front of the machine. The efficacy of this device is, however, not complete. In short, in the case of a modern press brake the reaction time of the press is of the order of from 80 to 100 or even 120 milliseconds, older press brakes having stopping times which are sometimes much longer. Now, as the high speed of the slide block reaches nowadays 100 millimeters per second, the resulting stopping distance is of the order of from 8 to 12 millimeters.

The position of the light beam is generally chosen to be 8 millimeters above the upper surface of the piece which is to be folded, so that the operator or anyone else cannot accidentally introduce his fingers under the punch after the safety system has been put out of action. In order that this device shall be effective it is indispensable that the speed of the slide block shall have been commuted from high speed (about 100 millimeters per second) to slow speed (20 millimeters per second as a maximum) before reaching the so-called safety point. At slow speed, as the stopping distance is no more than about 2 millimeters, safety is obtained. On the other hand, if the press has not been adjusted so as to drop to slow speed above the safety point, the folding is then carried out at high speed and the stopping distance is of the order of from 10 to 12 millimeters and safety is then no longer ensured.

SUMMARY OF THE INVENTION

An object of the invention is to provide a safety device of the intangible barrier type for a press brake or a similar machine, which includes a light beam of the type described above, arranged so as to enable complete safety.

For this purpose the invention is concerned with a safety device of the intangible barrier type for a press brake or a similar machine, which includes a light beam emitted by a source and received by a receiver and directed horizontally in the vicinity of the vertical plane described by the motion of the edge of the punch and at the place in the danger zone which is formed by the gap of variable height situated between the edge of the punch and the upper surface of the piece to be folded, the position of the light beam being fixed at a vertical distance from the upper surface of the piece to be folded, which lies between the thickness of a human finger and the stopping distance of the punch, characterized in that it includes a device for checking the speed of the punch, arranged so as to order interruption of the motion of the punch when the measured speed is greater than a predetermined speed.

Because of the presence of this safety device the operator must adjust the passing from high speed to be above the safety point in order to allow the operation of his press. As the measurement is carried out at every pass the system is in a position to detect if the slow speed is getting progressively out of adjustment during the course of working, which the operator could not become aware of in time in the absence of the said device.

The device for checking the speed of the punch may be disposed in the safety light beam or located above the safety light beam, employing another beam.

According to an embodiment of the device of the invention, the device includes a laser emitter located at one side of the press and emitting a laser beam and a receiver located at the other side of the press and including two photosensitive elements spaced vertically and located inside the perimeter of the laser beam.

The laser emitter may emit a beam controlled by a first quartz crystal, a second quartz crystal being arranged so that the two quartz crystals monitor one another mutually so as to guarantee accuracy of measurement and avoid any drift in frequency.

The two photosensitive elements may be built into one and the same case so as to guarantee an invariable spacing of the said two photosensitive elements.

The device may include two counters arranged so as to be started upon cut-off of the first photosensitive element and stopped upon cut-off of the second photosensitive element, and the device may be arranged so as to interrupt the travel of the punch if the number of pulses measured by at least one of the counters is less than a predetermined number.

According to a preferred embodiment of the device of the invention the distance between the light beam and the upper surface of the piece to be folded lies between 3 and 8 millimeters.

BRIEF DESCRIPTION OF THE DRAWINGS

The invention will be better understood with the aid of the description below, given by way of example, and referring to the drawings in which.

DETAILED DESCRIPTION OF THE PREFERRED EMBODIMENTS

Figure 1:
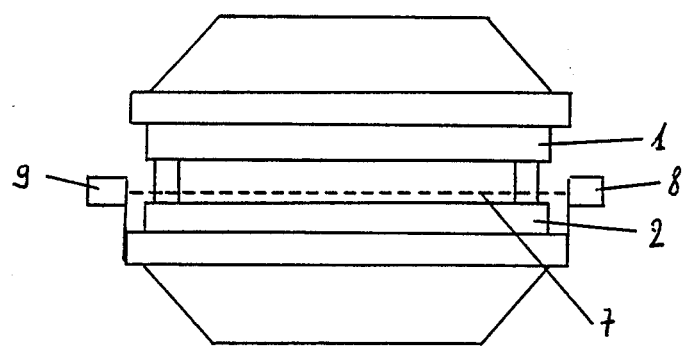
FIG. 1 is a diagrammatic side view of a press brake equipped with a device of the invention.
Figure 2:
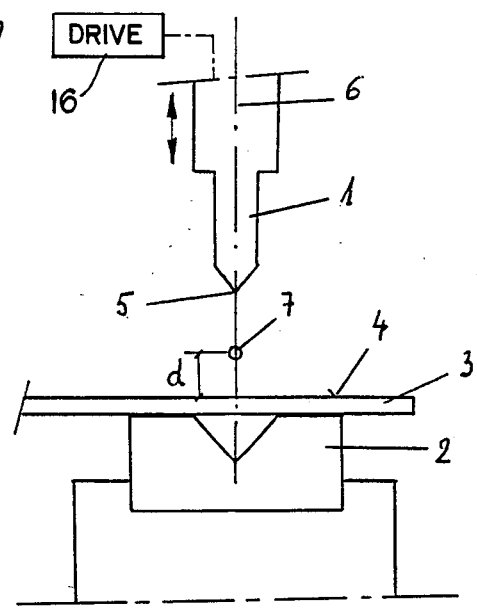
FIG. 2 is a diagrammatic partial vertical section through the press of FIG. 1.
Figure 4:
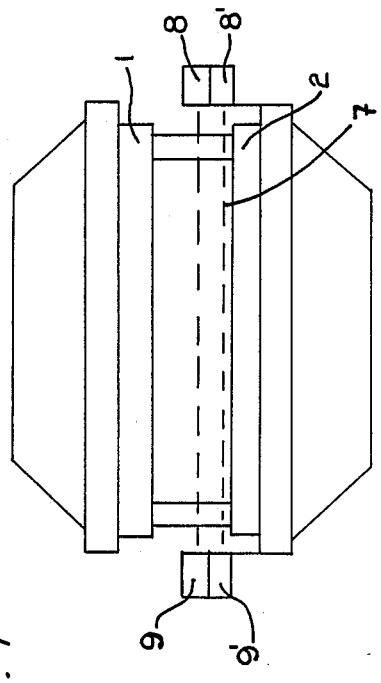
FIG. 4 is a diagrammatic side view of a press brake equipped with an alternative manner of using the current invention.

As represented in FIGS. 1 and 2, a light beam 7 is emitted by a source 8 such, for example, as a laser 15 (FIG. 4), located at one side of the press, and is received by a receiver 9 located at the other side of the press. As in conventional apparatus, if a body or other obstruction is introduced into the danger zone, either transversely or by pushing in front of the punch as it descends, thus causing the interruption of the light beam, the travel of the punch is interrupted. The press includes a punch 1 and a die 2 upon which is arranged a piece to be folded, such, for example, as a metal sheet 3. Drive 16, represented diagrammatically in FIG. 2, moves the punch 1 in reciprocation. During the motion of the press the edge 5 of the punch moves in a vertical plane 6. The position of the laser beam 7 is fixed in this vertical plane or in the vicinity of this vertical plane at a distance d above the upper surface 4 of the metal sheet, lying between the thickness of a finger, generally assumed to be 8 millimeters, and the stopping distance of the punch at slow speed, which is generally of the order of from 2 to 3 millimeters. In the diameter of the laser beam 7 is disposed a device which enables actual measurement of the speed of motion of the punch at the time the punch or any body being carried along by the punch passes in front of the beam. Of course the device intended for the measurement of the speed of the slide block may also be mounted above the safety beam 7 and employ another beam or similar device. Such an alternative is illustrated in FIG. 4, in which the source 8 and receiver 9 are disposed above a source 8' and receiver 9' for a safety light beam of the intangible barrier type.

Figure 3:
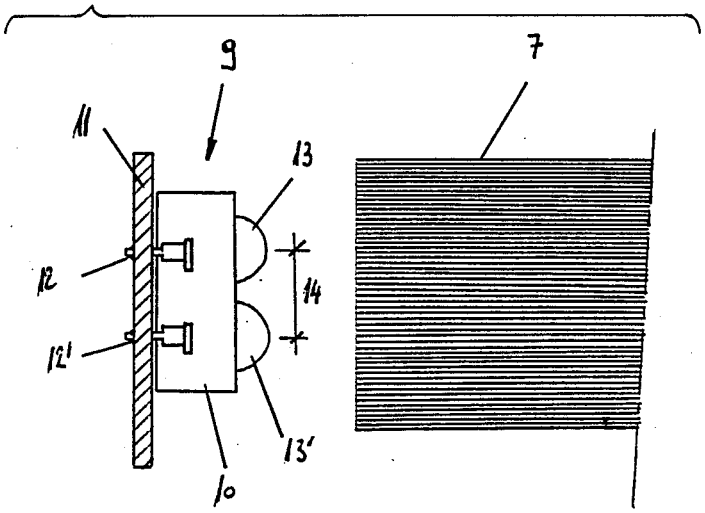
FIG. 3 is a diagrammatic longitudinal section through an example of the receiver of the device in accordance with the invention.

As represented in FIG. 3 and diagrammatically, the measurement of the speed of motion of the punch may, for example, be carried out by means of a receiver 9 which includes two photosensitive elements 13, 13' built into the same case 10. This arrangement is advantageous as it enables an invariable spacing 14 to be guaranteed between the photosensitive elements at the time of mounting the device, whatever the tolerances of piercing the holes 12, 12' in the printed circuit 11. Of course the photosensitive elements may also be mounted in separate cases.

The speed of the motion of the punch may be determined by dividing the distance 14 separating the two photosensitive elements 13, 13' by the interval of time which separates the instant of cut-off of the first photosensitive element 13 from the instant of cut-off of the second photosensitive element 13'. When the measured speed is higher than a predetermined speed, stoppage of the motion of the punch is immediately ordered.

Figure 5:
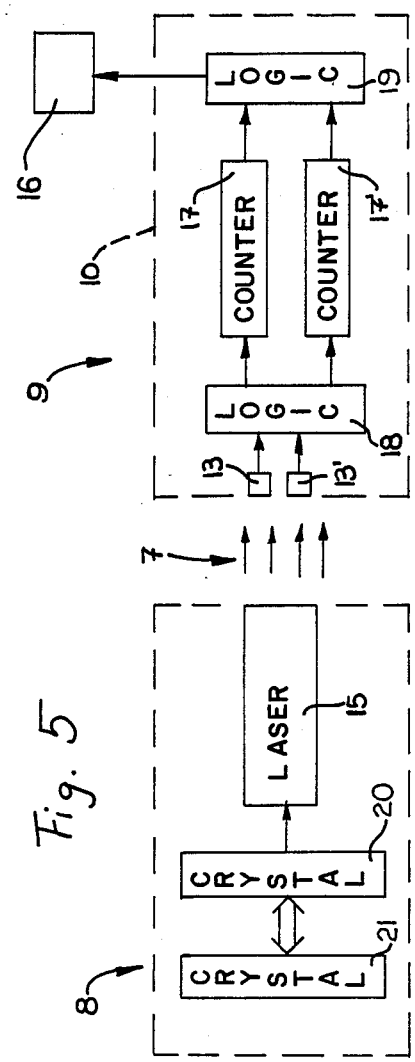
FIG. 5 is a block diagram illustrating relationships among elements of a preferred embodiment.

In accord with a preferred embodiment, and as shown diagrammatically in FIG. 5, a device for measuring the speed of the punch may include first and second counters 17, 17', preferably disposed in case 10. The two counters 17, 17' are started at the time of the cut-off of the first photosensitive element 13. These counters are stopped upon cut-off of the second photosensitive element 13'. This control of the counters 17, 17' may be accomplished by any conventional means, the structure of which forms no part of the current invention. In FIG. 5, such conventional means is represented generally as logic element 18.

When the count achieved by one or both of the counters is less than a predetermined count corresponding to the slow speed of 20 millimeters per second, the device immediately orders that the motion of the punch be stopped. This control of the punch may be accomplished by any conventional means, the structure of which forms no part of the current invention. In FIG. 5, such conventional means is represented generally as logic element 19, which controls punch drive means 16.

When the light source 8 is equipped with a laser 15, the modulated laser beam may be controlled by a first of two quartz crystals 20, 21. The first and second quartz crystals may monitor each other in order to guarantee accuracy and avoid any drift in frequency, which might distort the speed measurement.

Because of the presence of this safety device the operator must adjust the point of change from high speed to low speed to be above the safety point in order to allow the operation of his press. As the measurement is carried out at every pass the system is in a position to detect if the slow speed is getting progressively out of adjustment during the course of working, which the operator could not become aware of in time in the absence of the said device.

The permanent checking of the speed of passing the safety point, associated with the simultaneous check of the starting of the inhibited zone just before the measurement of the speed enables a safety system to be established which is inviolable for correct working conditions and offers complete safety.

The device of the invention may be mounted upon press brakes as well as on any similar machines such, for example, as shears, stamping presses or any machines necessitating a change in speed before working.

What is claimed is:

1. In a machine having an edge of a reciprocating punch operating in a danger zone that is formed by a gap of variable dimension between the edge of the punch and a surface of a work piece, the motion of the edge of the punch describing a plane, punch driving means of the machine having a characteristic stopping distance within which the approach of the punch to the work piece may be stopped in response to an unsafe condition, a safety device of the intangible barrier type comprising:

a light beam source emitting a light beam in a direction substantially transverse of the direction of motion of the punch, the beam being located in the vicinity of said plane and at a predetermined distance from said surface of a work piece, said predetermined distance having a magnitude between the thickness of a human finger and said characteristic stopping distance; and a receiver responsive to interruption of the light beam caused by motion of the punch, the receiver comprising a speed measuring device for measuring the speed of the punch, the punch driving means being responsive to the speed measuring device, the speed measuring device causing interruption of the motion of the punch when the measured speed of the punch is greater than a predetermined speed.

2. The apparatus of claim 1, the light beam source comprising a laser located at a first side of the machine, the receiver being located at a side of the machine opposite to the first side and comprising two photosensitive elements spaced in a direction substantially parallel to the path of travel of the punch, both photosensitive elements being located so as to intercept a laser beam emitted from the laser.

3. The apparatus of claim 2, both photosensitive elements being mounted in a single case so as to guarantee that the spacing of the photosensitive elements does not vary.

4. The apparatus of claim 3, further comprising control means response to the photosensitive elements, the punch driving means being response to the control means, the control means comprising:
first and second counters;
means for starting the counters upon interruption of a first one of the photosensitive elements and for stopping the counters upon the subsequent interruption of the second one of the photosensitive elements; and
means for causing the punch driving means to stop the travel of the punch if the count reached by at least one of the counters is less than a predetermined number.

5. The apparatus of claim 4, the light beam source comprising first and second quartz crystals mounted together with the laser, the first quartz crystal controlling the laser, the first and second quartz crystals monitoring each other so as to guarantee accuracy of measurement and avoid drift in frequency.

6. The apparatus of claim 5, both photosensitive elements being mounted in a single case so as to guarantee that the spacing of the photosenstive elements does not vary.

7. The apparatus of claim 6, further comprising control means responsive to the photosensitive elements, the punch driving means being responsive to the control means, the control means comprising:
first and second counters;
means for starting the counters upon interruption of a first one of the photosensitive elements and for stopping the counters upon the subsequent interruption of the second one of the photosensitive elements; and
means for causing the punch driving means to stop the travel of the punch if the count reached by at least one of the counters is less than a predetermined number.

8. The apparatus of claim 5, further comprising control means responsive to the photosensitive elements, the punch driving means being responsive to the control means, the control means comprising:
first and second counters;
means for starting the counters upon interruption of a first one of the photosensitive elements and for stopping the counters upon the subsequent interruption of the second one of the photosensitive elements; and
means for causing the punch driving means to stop the travel of the punch if the count reached by at least one of the counters is less than a predetermined number.

9. The apparatus of any of claims 1 - 8, the receiver further comprising conventional light-responsive means for causing the punch driving means to stop the travel of the punch whenever a light beam is interrupted, the conventional light-responsive means and the speed measuring device being disposed so as to be responsive to interruption of the same light beam.

10. The apparatus of claim 9, the light beam being located between 3 and 8 millimeters from said surface of a work piece.

11. The apparatus of any of claims 1-8, further comprising conventional light-responsive means for causing the punch driving means to stop the travel of the punch whenever a light beam is interrupted, the conventional light-responsive means being spaced from said receiver.

12. The apparatus of claim 11, the light beam to which said receiver is responsive being located between 3 and 8 millimeters from said surface of a work piece.

* * * * *